(12) United States Patent
Meade

(10) Patent No.: US 7,883,681 B2
(45) Date of Patent: Feb. 8, 2011

(54) SYNTHETIC CARBIDE LIME FILLER COMPOSITION AND METHOD OF MAKING

(76) Inventor: D. Mark Meade, 311-2 Toronto St., Barrie, ONT (CA) L4M 9R2

( * ) Notice: Subject to any disclaimer, the term of this patent is extended or adjusted under 35 U.S.C. 154(b) by 1504 days.

(21) Appl. No.: 10/841,903

(22) Filed: May 7, 2004

(65) Prior Publication Data
US 2004/0225050 A1    Nov. 11, 2004

Related U.S. Application Data

(60) Provisional application No. 60/469,585, filed on May 9, 2003.

(51) Int. Cl.
*C01F 11/02* (2006.01)
*C01F 11/06* (2006.01)
*C01F 11/18* (2006.01)

(52) U.S. Cl. .................... 423/432; 423/155; 423/583; 524/425; 106/464

(58) Field of Classification Search ................ 423/155, 423/583, 432; 524/425; 106/464; 34/523
See application file for complete search history.

(56) References Cited

U.S. PATENT DOCUMENTS

| | | | | |
|---|---|---|---|---|
| 5,643,415 A | * | 7/1997 | Wise | ........................ 162/181.2 |
| 6,310,129 B1 | * | 10/2001 | Lilly et al. | ................... 524/424 |
| 6,416,727 B1 | * | 7/2002 | Virtanen | ...................... 423/432 |
| 6,699,318 B1 | * | 3/2004 | Virtanen | ..................... 106/464 |

OTHER PUBLICATIONS

Dario T. Beruto and Rodolfo Botter, "Liquid-like H2O adsorption layers to catalyze the Ca(OH)2/CO2 solid gas reaction and to form a non-protective solid product layer at 20C," Journal of the European Ceramic Society 20 (2000), pp. 497-503.*

* cited by examiner

*Primary Examiner*—Timothy C Vanoy
*Assistant Examiner*—Diana J Liao
(74) *Attorney, Agent, or Firm*—Santosh K. Chari; Blake, Cassels & Graydon LLP

(57) ABSTRACT

A method for making a white synthetic carbide lime filler composition of calcium hydroxide and calcium carbonate, wherein the calcium carbonate is in the form of surface carbonation on the calcium hydroxide. The method can include calcining calcium carbonate, hydrating the calcined material under controlled conditions which maintain a low moisture content and fracture the hydrated material into small particles of calcium hydroxide, carbonating the small calcium hydroxide particles to create the surface carbonation of calcium carbonate, and classifying the carbonated synthetic carbide lime particles to separate off oversized particles. The method can use a combined classifying and carbonating process, and a modified classifying vessel can be provided to carry out the combined process.

Figure 2:
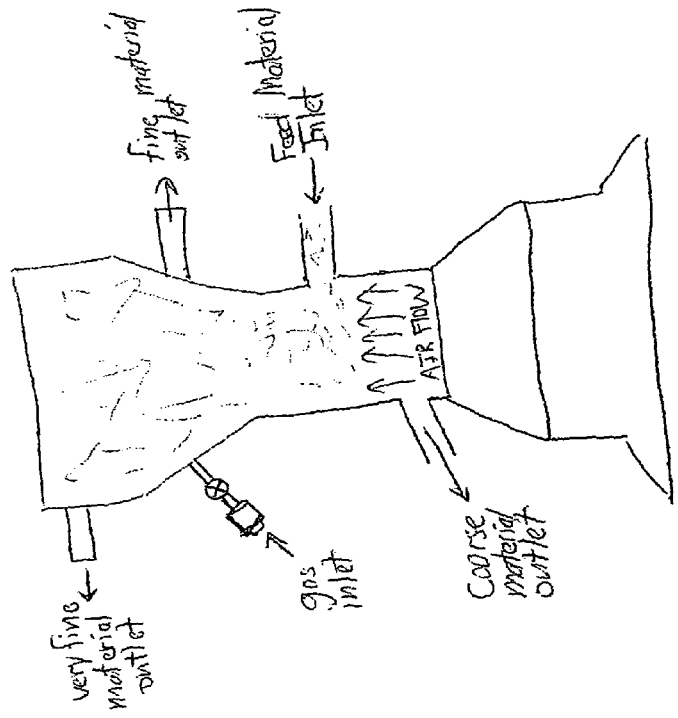

7 Claims, 1 Drawing Sheet

# SYNTHETIC CARBIDE LIME FILLER COMPOSITION AND METHOD OF MAKING

CROSS-REFERENCE TO RELATED APPLICATION

This patent application claims priority to U.S. Provisional Patent Application Ser. No. 60/469,585, filed May 9, 2003.

BACKGROUND

This invention relates generally to carbide lime used as a filler in thermoplastic compositions, and more particularly to a synthetic carbide lime filler and method of making the same.

Canadian Patent Nos. 2,213,086 and 2,296,609, and U.S. Pat. No. 6,310,129 ("the '129 patent"), which are hereby incorporated herein by reference, each patent describe a method for converting raw "carbide lime" waste material into a composition usable as a filler in thermoplastic resin materials. The raw carbide lime material is the waste by-product of acetylene gas production. All three patents contain essentially the same disclosure, and the '129 patent will typically be referred to hereinafter, and is representative of all three. As described in the '129 patent, the method basically comprises screening the raw carbide lime (size reduction), drying the screened carbide lime to obtain a low moisture content and a calcium carbonate content below 25 percent, fine grinding the dried material, and classifying the fine ground particles to separate a fraction of the particulates having a desired particle size, and corresponding lower specific gravity. As described in the '129 patent, this method results in a processed carbide lime composition which comprises 70 to 85 percent by weight calcium hydroxide and 5 to 25 percent by weight calcium carbonate, wherein the calcium carbonate is in the form of surface carbonation on the calcium hydroxide.

Since the advent of the processed carbide lime filler composition described in the '129 patent, certain benefits and drawbacks of the processed carbide lime composition have been discovered. One very significant beneficial quality discovered is that the processed carbide lime filler composition imparts sterilizing properties, unlike any other plastic or rubber filler or additive, to resin molded products in which the carbide lime filler composition is used as a filler material mixed with the resin. It is known that calcium hydroxide, a main constituent of the carbide lime filler composition, has antibacterial, anti-viral, and anti-fungal properties which can last up to a hundred years. Resin molded products made using the processed carbide lime filler composition apparently benefit from the calcium hydroxide content and are essentially sterilized. This characteristic makes resin molded products made with the processed carbide lime composition especially useful in applications where sterilization is important.

Another benefit imparted to polyvinyl chloride (PVC) resin molded products made with the processed carbide lime filler composition is the ability of calcium hydroxide to neutralize toxic gases from PVC combustion. Calcium hydroxide reacts favorably with toxic chloride gas produced by PVC combustion, resulting in two harmless substances, i.e., water and salt. A complementary quality is that the carbide lime filler composition is also flame retardant due to its high melting point, and exhibits a "hard char" effect after burning. Consequently, coating for electrical wiring, for example, which is made from a resin containing the processed carbide lime filler composition will not simply decompose when subjected to fire. Instead, the coating will form a hard coating on the wire, thus potentially preventing further hazard.

As explained in the '129 patent, commercial "synthetic" calcium hydroxide has been used, or the use thereof investigated, as fillers in resin molding systems. Some limitations and shortcomings of the use of calcium hydroxide as a filler are also described in that patent. It is also known to use calcium carbonate as a filler material in resin molding systems. There are numerous processes known for producing calcium carbonate, as described in, for example, U.S. Pat. Nos. 6,458,335 and 6,475,459 ("the '459 patent"). The '459 patent, for example, describes a process for producing precipitated calcium carbonate, and explains that the use of precipitated calcium carbonate is growing in various industries, such as paper, plastic, and pharmaceutical industries. The process for preparing calcium carbonate particles described in the '459 patent comprises reacting a starting material containing calcium oxide with carbonate ions in the presence of water to produce calcium carbonate, and recovering the calcium carbonate, characterized in that the formation is carried out directly from calcium oxide to calcium carbonate without intermediate stages. Additional, the process is carried out under intensive agitation such that the calcium carbonate becomes detached from the surface of the calcium hydroxide. Other methods known in the art for the manufacture of PCC are described in numerous patent applications listed in the '459 patent.

Calcium carbonate does not exhibit, and does not impart, the aforementioned anti-microbial or flame retardant properties to resin molded products. Unmodified calcium hydroxide used as a filler material in resin molding systems also does not impart the unique anti-microbial and flame retardant properties characteristic of the processed carbide lime composition. Unless calcium hydroxide is provided with the calcium carbonate surface carbonation, like the processed carbide lime composition, the desirable properties of the calcium hydroxide are not imparted to the resin molded product. This is apparently due to the surface carbonation providing a protective coating on the calcium hydroxide which permits the calcium hydroxide to be incorporated into the resin matrix in a manner in which unmodified calcium hydroxide cannot.

However, some disadvantages of the processed carbide lime composition made from raw "carbide lime," and the method for making such composition, have also been discovered. One disadvantage is that, in the method described in the '129 patent for making the composition, controlling the process to provide the precise amount of surface carbonation is relatively complex. A disadvantage related to this problem pertains to the raw carbide lime material itself. In particular, the naturally occurring surface carbonation of the raw material varies greatly depending on the source of the raw carbide lime material, i.e., whether from a "wet" or a "dry" source. The effects of the surface carbonation are key to the composition exhibiting the desirable properties described above. Specifically, it is believed that a thin surface carbonation, of calcium carbonate, on a calcium hydroxide core enables the important properties of the hydroxide to be exhibited in the molded resin product. The thin coating of surface carbonation insulates the calcium hydroxide from reactions which occur in the resin molding process to enable the composition to be incorporated in a resin matrix. In the molded product, the calcium hydroxide eventually passes through the thin surface carbonation and spreads throughout the resin material, thereby imparting the aforesaid beneficial properties. If there is no, or insufficient, surface carbonation polymer degradation can occur due to contact with the high pH calcium hydroxide, in the presence of trace amounts of moisture through which hydroxide freely travels, in resins which are sensitive to high pH environments. If there is too much surface carbonation, the hydroxide core diminishes, and there is not exhibited the aforesaid advantageous properties. Accordingly, accurate control over the degree of surface carbonation is an important step in the process.

A significant disadvantage of the processed carbide lime filler composition produced from raw carbide lime is that the composition has a grayish color, or discoloration. Consequently, any resin molded product in which the composition is utilized as a filler can have only a gray, or darker, coloring. The process for producing acetylene gas involves the use of coke, and it is believed that the coke permanently stains the raw carbide lime waste by-product, resulting in the grayish discoloration of the resulting processed carbide lime composition. Commercially, this is an important limitation, since there are many applications in which white or light colored products are highly desirable. The grayish color thus detracts from the marketability of the composition produced according to the process in the '129 patent.

In view of the aforesaid disadvantages of the processed carbide lime filler composition and method of making the same described in the '129 patent, it would be desirable to produce a new carbide lime filler composition which has all of the desirable characteristics of the carbide lime filler composition made from the raw carbide lime material, but none of the disadvantages. Specifically, it would be desirable to produce a carbide lime filler composition having a white color, and to provide a method for making such white carbide lime filler composition in which control of the surface carbonation procedure is simple, accurate and consistently repeatable.

SUMMARY

According to the invention, a "synthetic" carbide lime filler composition and a method of making the same is provided in which the synthetic carbide lime filler composition exhibits all of the advantageous anti-microbial and flame retardant qualities of the carbide lime filler composition described in the '129 patent, yet has a white color to enable the production of white, or light colored, resin molded products. Additionally, the method according to the invention for making the synthetic carbide lime can provide a process for more easily, accurately and consistently controlling the degree of calcium carbonate surface carbonation created on the calcium hydroxide.

The synthetic carbide lime composition can comprise 70 to 85 percent by weight calcium hydroxide, $Ca(OH)_2$, and 5 to 25 percent by weight calcium carbonate, $CaCO_3$, wherein the calcium carbonate is in the form of a predetermined degree of surface carbonation on the hydroxide core. Only a certain degree surface coating, i.e., resulting in the 5 to 25 percent constituent amount, is desired. Either too little or too much can result in the composition being unworkable, or not exhibiting the aforesaid desirable anti-microbial and flame retardant properties. The synthetic carbide lime composition can be white in color, and can have a brightness grade in the range of 92 to 100, depending on the grade of lime, or limestone, used in the method of making the composition. Alternatively, manufactured calcium carbonate could be used instead of lime, in which case the brightness of the manufactured calcium carbonate would affect the brightness grade of the synthetic carbide lime composition.

According to the invention, the method of making the synthetic carbide lime composition can comprise one or more of the following steps: calcining limestone to produce primarily calcium oxide; hydrating the calcium oxide under carefully controlled conditions to create primarily calcium hydroxide particles; creating a desired degree of calcium carbonate surface carbonation on the calcium hydroxide particles; and classifying the carbonated particulate material to separate out larger, oversize particles from smaller particles which stored or packaged for use as the synthetic carbide lime filler composition for resin molded articles.

Additional variations in the process according to the invention can include controlling the hydration step in various ways to enhance the production of the particulate calcium hydroxide material. Such variations can include controlling the hydration in a manner to maintain the moisture content of the hydrated material to about 0.10 percent water, and also agitating the material during the hydration process to facilitate the reaction and to keep the material well dispersed. A further variation can be to flow air into, or through, the hydrator over the fractured particulate material. The air can be provided at high pressures, can be heated, and/or can include a distinct gas constituent, such as carbon dioxide, and can potentially reduce the tendency for the fractured particles to agglomerate. Conveniently, the air can be the exhaust gas from the calciner, which is hot and latent with carbon dioxide.

According to the invention, a preferred method can include carrying out the carbonation process while the particles are being classified, and the carbonation procedure can be carried out using a heated carbon dioxide containing gas to provide a quicker reaction than if the gas were at, for example, ambient temperature.

Further according to the invention, a combined classifying and carbonating apparatus can be provided to carry out this process. The apparatus can comprise a conventional classifying vessel which has been modified to supply carbon dioxide containing gas into an interior chamber of the classifier in which the particulate calcium hydroxide material is suspended in as part of the classifying, i.e., particle separation, procedure. The source of the carbon dioxide containing gas can conveniently be the hot exhaust gas. A valved gas inlet can be provided to control the admission of the effluent containing carbon dioxide into the classifying chamber. The carbon dioxide reacts with the suspended particles creating the desired surface carbonation, and the residence time of the particulate material in the modified classifying vessel can be easily and accurately controlled to provide just the right degree of surface carbonation.

Alternatively, the carbonation process can be carried out by feeding the calcium hydroxide particulate material through a conventional flash drying process. In the flash drying process, the available residence time is typically very limited, and the degree of carbonation can be controlled via the temperature in the drying chamber of the flash dryer, and the outlet temperature, i.e., the BTU level, at which the flash dryer is operated. Where the flash drying process is used, the carbonation step can be followed by a separate particulate classifying step, such as using a conventional classifying device.

Additional process steps could also be added, such as an added step to fine grind the calcined hydrated material, particularly the larger agglomerates, into smaller particles prior to the carbonation process. Additionally, the material can be conveyed between each step of the process by, for example, mechanical augers, rather than, for example, blower conveyer so as not to pick up additional moisture from the air.

Further details, objects, and advantages of the invention will become apparent from the following detailed description and the accompanying drawings figures of certain embodiments thereof.

BRIEF DESCRIPTION OF THE DRAWING FIGURES

Figure 1:
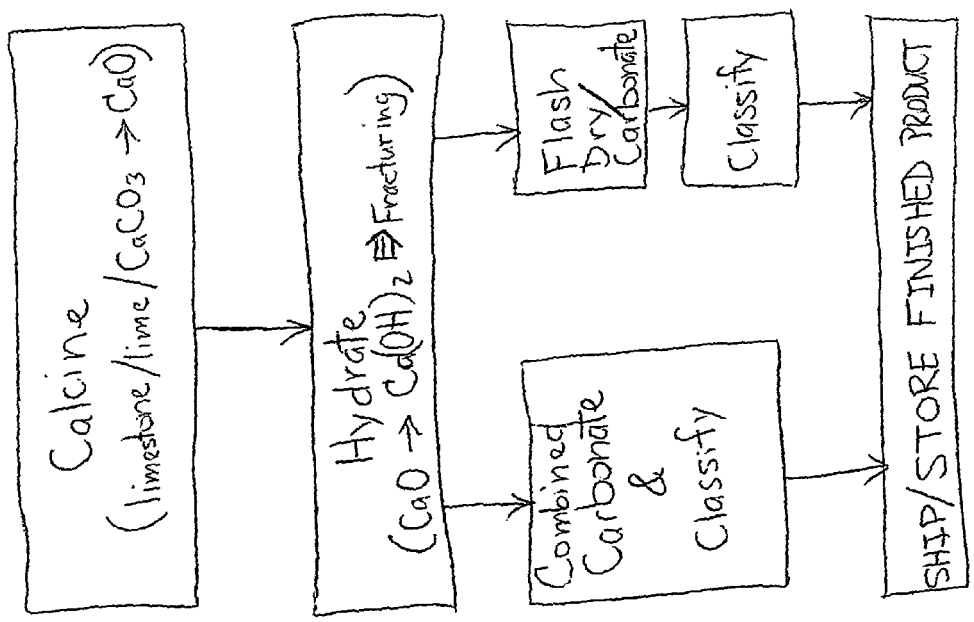

A more complete understanding of the invention can be obtained by considering the following detailed description in conjunction with the accompanying drawings in which:

FIG. 1 is a flow diagram generally illustrating a presently preferred embodiments of a method for making a synthetic carbide lime composition; and FIG. 2 is a simplified schematic diagram of an embodiment of a modified classifying vessel for performing a combined classifying and carbonating process according to embodiments of the method for making the synthetic carbide lime composition.

DETAILED DESCRIPTION

The diagram in FIG. 1 illustrates embodiments of a method according to the present invention for making a synthetic carbide lime filler composition comprising calcium hydroxide, $Ca(OH)_2$, with a surface carbonation of calcium carbonate, $CaCO_3$. The method can basically comprise the steps of calcining calcium carbonate to produce calcium oxide; hydrating the calcium oxide to produce calcium hydroxide (which process also results in the calcium hydroxide being fractured into smaller particles); using either of two alternative carbonating processes for creating a surface carbonation on the calcium hydroxide particles; classifying the particles to separate a smaller sized fraction of particles, having a lower specific gravity (which comprises the finished synthetic carbide lime composition/powder); and then storing and/or shipping the finished product.

The synthetic carbide lime composition produced according to the method, using either carbonating process, is substantially white in color, exhibiting no stain or discoloration which is characteristic of the processed carbide lime composition produced according to the method described in the '129 patent.

The raw material source for producing synthetic carbide lime according to the invention, can be lime, or pulverized limestone, from previously mined ore tailings, or from newly mined sources. Although more cost prohibitive, ground calcium carbonate could also be utilized. The limestone can be obtained from mining companies or dealers of such material. Limestone is graded by its color based on purity. A mined limestone with 7-8% mineral content, e.g., aluminum oxide, magnesium, sodium, etc., is generally 94 on the white brightness scale. This type of material can be obtained from producers in Texas. A high purity, e.g., 99.9% pure, limestone is 97 on the scale, and generally has a bright white color. This more pure material can be obtained from producers in the Caribbean. The higher the purity of the limestone, the brighter white will be the resulting synthetic carbide lime composition. If manufactured calcium carbonate were used, the brightness of the resulting composition would depend upon the brightness of the manufactured calcium carbonate. If the limestone is mined and crushed onsite, the limestone can be conveyed from the crushing area to a calcining oven. If pulverized limestone material is purchased and stored onsite, it can be conveyed from the storage area to the calciner. Mechanical augers can be employed to convey the material to the calciner. Moreover, the augers can be used to convey the material between each of the processing steps described below.

The calciner can be of a conventional type, and can generally comprise a cylindrical oven, laid on its horizontal axis and rotated like a drum. The oven is rotated to tumble the material to keep it loose an promote more even heating. The calciner can heat the lime to a temperature of from about 1000 F to about 2000 F. In a preferred embodiment, the material is heated to about 1800 F. The calcining operation converts the crushed limestone, which is primarily calcium carbonate ($CaCO_3$), to primarily calcium oxide (CaO), as the reaction drives off carbon dioxide ($CO_2$). When the reaction is completed, the calcined material can then be conveyed, such as by the mechanical augers, to a storage area, such as a silo, where the material can be cooled. Alternatively, the material could be immediately hydrated.

The calcium oxide material can be conveyed, such as via mechanical augers, to a hydration station whereat the calcium oxide can be hydrated to create calcium hydroxide. In the hydration process, the material can be evenly flowed at the rate of 50 lbs per minute in order to help keep the particles separated as much as possible. The hydration process results in the chemical reaction of water with the calcium oxide material which produces primarily calcium hydroxide. The hydration process can be controlled to maintain a preferred moisture content of about 0.10 percent water. Water is sprayed onto the material at a rate of about 0.5 pounds of water per pound of material. The hydration process can result in the fracturing of the calcium hydroxide material into roughly 1 micron particles, but these particles can tend to quickly agglomerate, in the presence of moisture, into clusters averaging about 5 to 7 microns, with a top size of about 100 microns. The hydrating process can also be facilitated by agitating the material during hydration, to keep the material well dispersed and facilitate the reaction, including the fracturing of the material into small particles. Moreover, air can be flowed over the fractured calcium hydroxide particles. The air can be provided, for example, through one end of the hydrator, over the fractured calcium hydroxide particles a short time before the end of the reaction, a short time following the end of the reaction, or, preferably, at the end of the reaction. The air can also be provided into the hydrator under pressure. The hydration process chemically fractures the calcium hydroxide into mostly 1 micron particles, but the nature of the calcium hydroxide, and the presence of moisture, tends to cause the 1 micron particles to quickly agglomerate into larger clusters which can be up to several hundred microns in size. Forcing air over the fractured particles may inhibit the tendency of the 1 micron particles to agglomerate into larger clusters after to the initial fracturing occurs. The air could also be heated, and could also, potentially, contain carbon dioxide. In such case, the hot exhaust gas from the calcining oven could supply the air/gas. However, this may also result in creating some surface carbonation on the calcium hydroxide particles. Thus, this process could potentially replace the separate carbonation process, or at least would have to be taken into account in a subsequent carbonating step.

In a preferred embodiment, the calcium hydroxide particles can be carbonated and classified at the same time. A conventional classifier vessel separates different sized particles according to a well known methods, including a method wherein the particles to be separated are suspended in an interior classifying chamber of the device as part of the separation process. This procedure wherein the particles are suspended can be used advantageously to facilitate a more efficient method of carrying out the carbonation process. In particular, a conventional classifier device can be modified to deliver carbon dioxide containing gas into the interior classifying chamber of the vessel wherein the particles are suspended in air. The carbon dioxide latent effluent reacts with the suspended calcium hydroxide particles, in a controlled reaction, to create the desired thin surface coating of calcium carbonate, i.e., to create a carbonate "ring" on a calcium hydroxide core. In this manner the "synthetic" carbide lime composition is produced, which can comprise preferably about 70-85% by weight calcium hydroxide and about 5-25% by weight calcium carbonate, wherein the calcium carbonate is present in the form of surface carbonation on a "core" of calcium hydroxide. The synthetic carbide lime composition is also white, and can have a grade in the range of 92 to 100 on the brightness scale.

The combined classifying and carbonating process can be carried out using a heated carbon dioxide containing gas. Heated gas can facilitate an improved carbonation reaction, which can be carried out more quickly, than if the gas were provided at, for example, ambient temperature. Conveniently, the readily available hot exhaust gas from the calcining ovens can be the source of the heated gas, which is hot and latent with carbon dioxide. The exhaust gas can be cleaned, e.g., dust particles filtered, prior to being supplied to the modified classifying vessel. For example, the exhaust gas can be directed through an air bag which basically has filters to remove air born particulate (usually less than 1 micron). The cleaned exhaust gas is then delivered to the modified classifier vessel. The exhaust gas can have a temperature of around 1800 F, or higher, at the exit of the calcining oven, but can be down to from about 800 F to 1700 F at the combined carbonating and classifying step. The lower temperature can occur due to heat losses in the piping which can be used to convey the hot exhaust gas from the calciner to the modified classifying vessel.

The amount of surface carbonation created during the carbonating process can be controlled as a function of the amount of time the calcium hydroxide particles are exposed to the carbon dioxide. The modified classifier device, like conventional classifier devices, conveniently permits the particulate material to be held therein for a relatively long residence times. The longer the calcium hydroxide particulates are resident in the classifier vessel and exposed to the carbon dioxide, the greater the extent of surface carbonation. Since the residence time can be easily and precisely controlled to produce the desired degree of surface carbonation, the process is greatly facilitated using the modified classifying and carbonating vessel. The residence time can be from as little as 1 second, to as much as 17 minutes. A preferred residence time can be from about 1 second to about 10 seconds.

The classifying process separates the carbonated particulate material into different grades, and eliminates oversize particulate, i.e., particles too large for use as a filler in resin molding systems. About 70 percent of the fractured particulate material from hydrating process can be in the range of 1 to about 25 microns, which is an acceptable size for use as a filler material in resin molding systems. The classifying process is employed to take off the roughly 30 percent of oversize particles. The classifier can also separate the particulates into a finer grade of the composition, consisting of substantially all 1 micron particles, and a standard grade of the composition, consisting of an average particle size of about 3-5 microns and a top size of about 25 microns. The roughly 30 percent of oversize material can be fed back to the calcium carbonate feed material for reprocessing, or can be sold for other uses.

The agglomerated particles could be processed in a further fine grinding step after hydration, and prior to carbonating. However, such grinding can be unnecessary, since about seventy percent of the particulate material can be in a desired size range, having a mean particle diameter of about 3 microns and a top size of about 25 microns. Only about thirty percent of the material is larger, and this thirty percent oversize material can easily be recycled back to the lime feed material for reprocessing. Consequently, an added step of fine grinding can actually make the process more costly and less efficient than simply recycling the oversize material back for reprocessing. Additionally, there can be other commercial uses for the oversize material, such that reprocessing may not even be desired.

Alternatively to the combined carbonating and classifying process, separate carbonating and classifying processes could be used. For example, the calcium hydroxide particulates could instead be carbonated using a flash drying process. Flash drying can be done using, for example, a conventional device known as an Aljet™ dryer, in which particulate matter can be subjected to heat and carbon dioxide. If desired, the calcium hydroxide particles could be fine ground before flash drying. Similarly to the modified classifier vessel, the degree of carbonation provided can be controlled by controlling the amount of time the particles are exposed to the carbon dioxide containing effluent. However, residence time of the particulates in the flash dryer is not as readily controllable as in the modified classifier vessel. Generally, the flash dryer is operated at a certain output level, i.e., at a certain BTU level, and the residence time is more a function of the through-put rate of the particulate material. Thus, the degree of carbonation, according to the invention, can be limited, or controlled, in the flash drying process by adjusting the outlet temperature and the inlet temperature (which is related to the through-put of the particulate material). The higher the BTU rate of operation, the greater the degree of carbon dioxide gas contained in the effluent. Thus, for a given through-put rate, the higher the output, the greater will be the degree of carbonation. In a preferred embodiment, the flash dryer can be controlled to operate at an inlet temperature from about 200 F to about 500 F, and an outlet temperature from about 200 F to about 1000 F, and at an output level of about 500,000 BTUs. The corresponding through-put rate can be anywhere from about 100 lbs/hr to about 20,000 lbs/hr. To increase the production level, the flash dryer could be operated at increased BTUs (as much as about three million BTUs), and the throughput rate of hydrated material could be increased as a function thereof. The control over the carbonation process using a flash dryer can be accurate, but can be more difficult than using the aforementioned combined classifying and carbonating device. A typical residence time in the flash dryer can be from about 1 to 3 seconds.

A product of the methods described above can be a substantially white "synthetic" carbide lime composition, e.g., powder, comprising 70 to 85 percent by weight calcium hydroxide and 5 to 25 percent by weight calcium carbonate, wherein the calcium carbonate is in the form of surface carbonation on the calcium hydroxide. In a preferred embodiment, the calcium carbonate comprises about 10 percent by weight of the composition, with the calcium hydroxide comprising the approximately 90 percent remainder. The synthetic carbide lime composition can have a pH of about 11.5 at the calcium hydroxide core, and a pH of about 7 at the calcium carbonate surface.

A product of the methods described above can be a substantially white "synthetic" carbide lime composition, e.g., powder, comprising 70 to 85 percent by weight calcium hydroxide and 5 to 25 percent by weight calcium carbonate, wherein the calcium carbonate is in the form of surface carbonation on the calcium hydroxide. In a preferred embodiment, the calcium carbonate comprises about 10 percent by weight of the composition, and the composition can preferably have a moisture content of 0.1 percent or less by weight. In addition, the synthetic carbide lime filler composition exhibits a generally round particle shape, which allows for faster extrusion molding with less back pressure, and has a specific gravity of as low as about 2.25 gm/cc (for an ultra-fine product), up to about 2.69 gm/cc.

The anti-microbial properties of the synthetic carbide lime filler composition are impart permanent biocidal properties to resin molded products. These properties are stable, and essentially permanent, such that fungus, algae, and other germs are not able to become established and/or reproduce, or give rise to more harmful growths. The partial calcium carbonate ringing of the calcium hydroxide core enables the otherwise essentially unworkable use of calcium hydroxide within a resin matrix. It is generally known, and tests have shown, that the use of unmodified calcium hydroxide as a filler material in resin molding systems can typically result in chemical reactions which are detrimental to the resin structure. The surface carbonation protects the calcium hydroxide core, enabling the composition to mix into and become embedded within the resin without resulting in chemical reactions which would be detrimental to the resin structure. Once embedded in the resin matrix of molded products, the passage of moisture in the air through the open cells in the resin can cause a slow, or gradual, release of the hydroxide core. The hydroxide spreads throughout the resin structure, thereby creating a stable anti-microbial environment which sterilizes and protects against fungus, algae, and other germs.

Prior to the classifying step, about 70 percent of the carbonated particulate can have a mean particle size of about 5 to about 15 microns, and a top size of about 25. Ideally, the average particle size can be about 3 microns. Thus, the oversize material, i.e., larger than about 25 microns on average, can constitute only about 30 percent of the carbonated particles. As explained generally above, in connection with the method, the synthetic carbide lime composition comprises particulate material which is classified by a procedure wherein heavier, larger particles are separated out using turbulent air to suspend the material in air. The "good," i.e., smaller and lighter particles, and agglomerates, are transferred to a second stage in the classifier device, whereas the heavier material is drawn out through the bottom of the device. The undesirable oversize material can be returned to the calcium hydroxide feed stock for reprocessing or sale for other uses. In a first stage of the classifying procedure, the portion of the particulate material having an average particle size of about 3 microns and a maximum particle size of about 25 microns (which constitutes the aforesaid 70% of the material) can be separated from the roughly 30 percent of oversize particles. This 70% is the "good" material, which comprises the finished synthetic carbide lime filler composition, and is ready to be mixed with resin without any further processing. The other 30%, i.e., the "bad" material, having an average size between about 30 microns up to about 200 microns, can be put back into the feedstock.

After the classifying step, the "good" material can be immediately stored in air sealed silage or containment vessels to prevent the access of moisture latent air. Alternatively, the finished composition can be fed directly to a component makers extrusion line, and/or can be made directly into masterbatch or a compounded blend of resins and fillers. In the case of a compounded blend, the resulting pellets can be pre-dried at the component makers to starve off surface moisture collected in transportation.

The classifying process can have two stages, a first stage to remove the 30 percent of oversize material, and a second stage to separate a finer grade of material. In the second stage, the 70 percent of good material can be further separated into two groups. The first group can be a high purity, or ultra-fine, product comprising substantially uniform one micron size particles, and the second group can comprise a standard grade of the composition, wherein the particles have a average size of about 3 microns and a top size of about 25 microns. The ultra-fine synthetic carbide lime filler can be a fine powder, consisting almost entirely of 1 micron particles. The ultra-fine grade of material can have a very low specific gravity of from about 2.25 to about 2.35. Preferably, the high purity material comprises less than 10 percent calcium carbonate by weight. The standard grade material can comprise about 10 percent calcium carbonate by weight, and can have a specific gravity of from about 2.35 gm/cc to about 2.69 gm/cc. The ultra-fine material can typically be supplied in powder form, whereas the standard grade can typically be supplied in either powder form or in "masterbatch" form, i.e., powder mixed with resin in a 50:50 blend.

In general, the synthetic carbide lime composition produced by methods according to the invention can have the same basic qualities, properties, and/or characteristics of the processed carbide lime composition described in the '129 patent, except that the synthetic carbide lime composition has a substantially white color, i.e., has no grayish stain, or discoloration. The synthetic carbide lime composition is free from staining or other discoloration caused by coke staining of the raw carbide lime waste by-product material.

However, the synthetic carbide lime composition can be utilized in the same ways, and with the same types of resins, additives, and the like, and in the same quantities and ratios, as the processed carbide lime composition described in the '129 patent.

Referring now to FIG. 2, a combined carbonation and classification apparatus is illustrated for creating surface carbonation of calcium carbonate on calcium hydroxide particulate material. The apparatus can comprise a modified classifying vessel having an interior chamber wherein the particulate material is suspended during a particle separation procedure; a particulate material inlet communicable with the interior chamber; one or more (two shown) outlets communicable with the interior chamber for dispensing separated (classified) particulate material from the interior chamber; and a gas inlet selectively communicable with the interior chamber to expose the particulate material to carbon dioxide while the particles are suspended therein; wherein the carbon dioxide reacts with the suspended particulate material to form the desired surface carbonation. The apparatus can further include a valve member associated with the gas inlet for controlling admission of the carbon dioxide into the interior chamber.

According to the invention, a method for creating surface carbonation of calcium carbonate on calcium hydroxide particles using an apparatus as described above can comprise suspending the calcium hydroxide particles in the interior chamber (typically via forced air); carbonating the particles by exposure to carbon dioxide while the particles are suspended in the interior chamber; and wherein the carbonating is carried out for a predetermined time period to create the desired degree of surface carbonation. The carbonating process can be carried out using a heated carbon dioxide containing gas, which can be supplied form the hot exhaust gas of a calcining over. The residence time, which results in the desired degree of carbonation, i.e., from about 5 to about 25 percent by weight calcium carbonate, can be from about 1 to about 17 minutes. A preferred residence time can be from about 1 second to about 10 seconds.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method of creating surface carbonation of calcium carbonate on calcium hydroxide particles to form synthetic carbide lime particles, the method comprising:
    a. suspending said calcium hydroxide particles in air;
    b. carbonating said suspended calcium hydroxide particles by exposure to carbon dioxide; and
    c. wherein said carbonating is carried out for a predetermined time period to create said surface carbonation on said calcium hydroxide particles and wherein the synthetic carbide lime particles comprise about 70-85% calcium hydroxide and about 5-25% calcium carbonate.

2. The process of claim 1 further comprising carrying out said carbonating using a heated carbon dioxide containing gas.

3. The process of claim 1 wherein said predetermined time period comprises a time sufficient to create only a partial surface carbonation on said particles.

4. The process of claim 3 wherein said predetermined time period comprises from about 1 second to about 10 seconds.

5. The process of claim 1 wherein said carbonating is carried out by a flash drying process using a flash dryer.

6. The process of claim 5 wherein said carbonating is controlled as a function of an output level of said flash dryer and a throughput rate of said calcium hydroxide particles.

7. The process of claim 1 wherein said calcium hydroxide particles are suspended in a chamber and wherein said suspension occurs during a particle separation or classification process.

* * * * *